(12) United States Patent
Liu et al.

(10) Patent No.: US 12,235,535 B2
(45) Date of Patent: Feb. 25, 2025

(54) DISPLAY APPARATUS AND ELECTRONIC DEVICE

(71) Applicants: Beijing BOE Technology Development Co., Ltd., Beijing (CN); BOE TECHNOLOGY GROUP CO., LTD., Beijing (CN)

(72) Inventors: Zongmin Liu, Beijing (CN); Long Wang, Beijing (CN); Feng Qu, Beijing (CN); Biqi Li, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/022,190

(22) PCT Filed: Mar. 30, 2022

(86) PCT No.: PCT/CN2022/083936
§ 371 (c)(1),
(2) Date: Feb. 20, 2023

(87) PCT Pub. No.: WO2023/184204
PCT Pub. Date: Oct. 5, 2023

(65) Prior Publication Data
US 2024/0272468 A1    Aug. 15, 2024

(51) Int. Cl.
*G02F 1/1333* (2006.01)
*G01S 7/35* (2006.01)
(Continued)

(52) U.S. Cl.
CPC .......... *G02F 1/13338* (2013.01); *G01S 7/352* (2013.01); *G02F 1/133514* (2013.01);
(Continued)

(58) Field of Classification Search
CPC .......... G02F 1/13338; G02F 1/133514; G02F 1/133528; G02F 1/134309; G02F 1/1345;
(Continued)

(56) References Cited

U.S. PATENT DOCUMENTS

| 2016/0054436 A1* | 2/2016 | Lee | G09G 3/20 345/87 |
| 2018/0220540 A1 | 8/2018 | Suzuki et al. | |

(Continued)

FOREIGN PATENT DOCUMENTS

| CN | 101308266 A | 11/2008 |
| CN | 106932947 A | 7/2017 |

(Continued)

*Primary Examiner* — Tom V Sheng
(74) *Attorney, Agent, or Firm* — HOUTTEMAN LAW LLC

(57) ABSTRACT

A display apparatus and an electronic device are provided, and belong to the field of display technology. The display apparatus includes a display module and a plurality of antenna units integrated on the display module. The display module includes a first substrate and a second substrate opposite to each other and a liquid crystal layer between the first substrate and the second substrate; each antenna unit includes a first radiation portion and a first reference electrode opposite to each other; the first radiation portion is on a light outgoing side of the display module; and the first substrate includes a first base substrate and a driving layer on a side of the first base substrate close to the liquid crystal layer; and the driving layer is also used as the first reference electrode of each antenna unit.

17 Claims, 6 Drawing Sheets

(51) Int. Cl.
  *G02F 1/1335* (2006.01)
  *G02F 1/1343* (2006.01)
  *G02F 1/1345* (2006.01)
  *G06F 3/01* (2006.01)
  *H01Q 1/22* (2006.01)
  *H01Q 9/04* (2006.01)
  *H01Q 21/06* (2006.01)
  *G01S 7/04* (2006.01)

(52) U.S. Cl.
  CPC .. *G02F 1/133528* (2013.01); *G02F 1/134309* (2013.01); *G02F 1/1345* (2013.01); *G06F 3/017* (2013.01); *H01Q 1/22* (2013.01); *H01Q 9/0407* (2013.01); *H01Q 21/065* (2013.01); *G01S 7/04* (2013.01)

(58) Field of Classification Search
  CPC ............ G01S 7/352; G01S 7/04; G06F 3/017; H01Q 1/22; H01Q 9/0407; H01Q 21/065
  USPC .......................................................... 345/156
  See application file for complete search history.

(56) References Cited

U.S. PATENT DOCUMENTS

| | | | |
|---|---|---|---|
| 2021/0026178 A1* | 1/2021 | Wang | H01Q 1/243 |
| 2022/0263220 A1* | 8/2022 | Huang | H01Q 21/08 |
| 2022/0263238 A1* | 8/2022 | Huang | H04M 1/0266 |
| 2022/0311141 A1* | 9/2022 | Wang | H01Q 9/0457 |
| 2022/0373837 A1* | 11/2022 | Zhang | H01Q 1/38 |
| 2024/0162616 A1* | 5/2024 | Feng | H01Q 21/08 |
| 2024/0250444 A1* | 7/2024 | Wang | H01Q 13/10 |

FOREIGN PATENT DOCUMENTS

| | | |
|---|---|---|
| CN | 106950748 A | 7/2017 |
| CN | 112750870 A | 5/2021 |
| CN | 112947780 A | 6/2021 |

* cited by examiner

DISPLAY APPARATUS AND ELECTRONIC DEVICE

TECHNICAL FIELD

The present disclosure relates to the field of display technology, and in particular to a display apparatus and an electronic device.

BACKGROUND

The non-contact gesture interaction technology plays an increasingly important role in the field of human-computer interaction. At present, the non-contact interaction can be realized by a plurality of methods, including machine vision, ultrasound, millimeter wave or the like. The millimeter wave-based interaction becomes a technical and market hotspot because it is not influenced by ambient light, protects the privacy, and has a wide interaction range.

SUMMARY

The present disclosure is directed to at least one of the problems of the prior art, and provides a display apparatus and an electronic device.

In a first aspect, an embodiment of the present disclosure provides a display apparatus, including a display module and a plurality of antenna units integrated on the display module: the display module includes a first substrate and a second substrate opposite to each other and a liquid crystal layer between the first substrate and the second substrate; each antenna unit includes a first radiation portion and a first reference electrode opposite to each other; the first radiation portion is on a light outgoing side of the display module; and the first substrate includes a first base substrate and a driving layer on a side of the first base substrate close to the liquid crystal layer; and the driving layer is also used as the first reference electrode of each antenna unit.

In some embodiments, the second substrate includes a second base substrate and a color filter layer on a side of the second base substrate close to the liquid crystal layer; and the first radiation portion is on a side of the second base substrate away from the color filter layer.

In some embodiments, the display apparatus further includes a first polarizer on a light incoming side and a second polarizer on the light outgoing side; and the second polarizer includes an adhesive layer, a first support layer, a polarizing layer, a second support layer, a low reflection layer and a protective layer which are stacked in a direction away from the liquid crystal layer; and the first radiation portion is between the first support layer and the adhesive layer.

In some embodiments, each antenna unit further includes a feed structure electrically connected to the radiation portion.

In some embodiments, the feed structure includes a signal electrode, and second reference electrodes on both sides of an extending direction of the signal electrode; and the signal electrode is connected to the first radiation portion through a first feed line.

In some embodiments, the display apparatus further includes a flexible adapter plate and a printed circuit board; the feed structure is bonded to the flexible adapter plate; and the flexible adapter plate is bonded to the printed circuit board.

In some embodiments, the plurality of antenna units includes a plurality of first sub-units and a plurality of second sub-units: the first radiation portions of the plurality of first sub-units are arranged side by side along a first direction; and the first radiation portions of the plurality of second sub-units are arranged side by side along a second direction.

In some embodiments, the display apparatus further includes a first radiation layer on the light outgoing side of the display module: the first radiation portions are in the first radiation layer; and the first radiation layer further includes redundant radiation portions, each of which is between two adjacent first radiation portions, and the redundant radiation portions are disconnected from the first radiation portions.

In some embodiments, the first radiation layer includes a conductive mesh structure: the conductive structure includes a plurality of first conductive lines and a plurality of second conductive lines crossing the plurality of first conductive lines; and the plurality of first conductive lines and the plurality of second conductive lines are broken at boundaries of the first radiation portions and the redundant radiation portions.

In some embodiments, each of the plurality of first conductive lines and the plurality of second conductive lines has a line width in a range of 2 μm to 30 μm; and a line thickness in a range of 1 μm to 10 μm.

In some embodiments, the plurality of antenna units includes a plurality of first sub-units and a plurality of second sub-units: the plurality of first sub-units are arranged side by side along a first direction; and the plurality of second sub-units are arranged side by side along a second direction: the display apparatus further includes a radio frequency signal generating unit, a radio frequency signal processing unit and a data processing unit: the radio frequency signal generating unit is configured to generate a transmitting signal, transmit a part of the transmitting signal through the plurality of second sub-units, and transmit another part of the radio frequency signal to the transmitting signal processing unit: the radio frequency signal processing unit is configured to process the transmitting signal transmitted by the radio frequency signal generating unit and a return signal received by the plurality of first sub-units; and the data processing unit is configured to acquire gesture information according to the processed transmitting signal and the return signal.

In some embodiments, the radio frequency signal generating unit includes a modulation wave generator, a power divider, and a power amplifier: the modulation wave generator configured to generate a frequency modulated continuous wave as the transmitting signal: the power divider is configured to divide the transmitting signal generated by the modulation wave generator into two parts; and the power amplifier is configured to amplify the transmitting signal transmitted by the power divider and transmit the amplified transmitting signal through a transmitting antenna.

In some embodiments, the radio frequency signal processing unit includes: a low noise amplifier, a first mixer, a second mixer, a first intermediate frequency processor, a second intermediate frequency processor, a first analog-to-digital converter and a second analog-to-digital converter: the low noise amplifier is configured to amplify a return signal received by an antenna: the first mixer is configured to mix the transmitting signal transmitted by the power divider with the amplified return signal and output a first mixing signal: the second mixer is configured to mix the transmitting signal transmitted by the power divider and phase-shifted by 90° with the amplified return signal and output a second mixing signal: the first intermediate frequency processor is configured to process the first mixing signal to obtain a first intermediate frequency signal: the second intermediate frequency processor is configured to process the second mixing signal to obtain a second intermediate frequency signal: the first analog-to-digital converter is configured to convert the first intermediate frequency signal into a first digital signal and transmit the first digital signal to the data processing unit; and the second analog-to-digital converter is configured to convert the second intermediate frequency signal into a second digital signal and transmit the second digital signal to the data processing unit.

In a second aspect, an embodiment of the present disclosure provides an electronic device, which includes the display apparatus in any one of the above embodiments.

DETAIL DESCRIPTION OF EMBODIMENTS

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Figure 1:
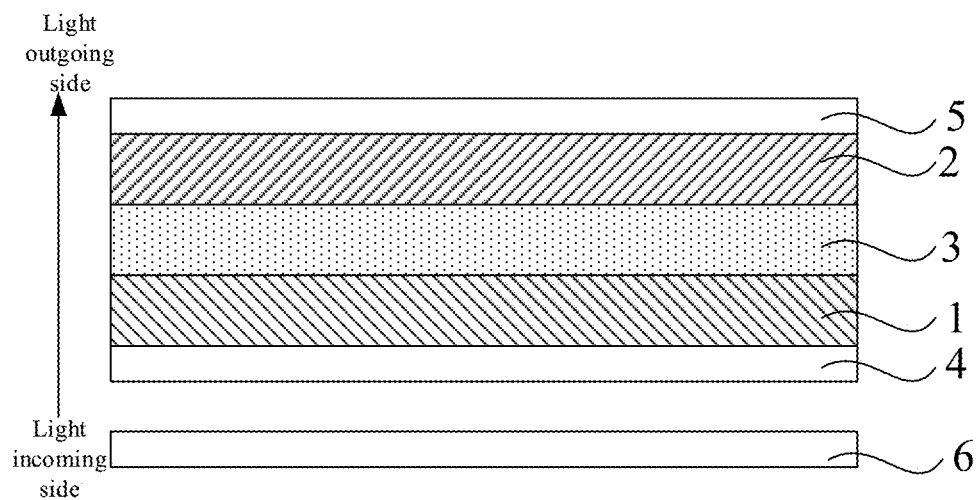
FIG. 1 is a schematic diagram of an exemplary liquid crystal display apparatus.
Figure 2:
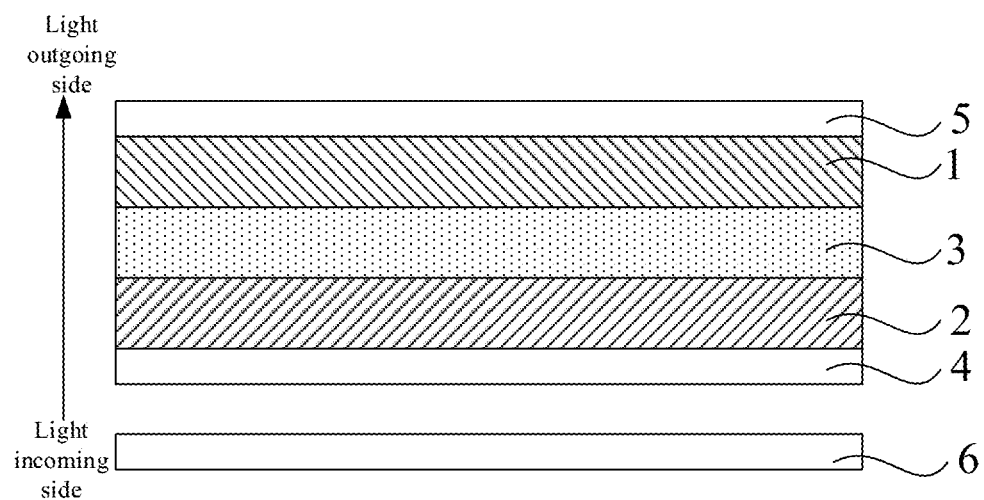
FIG. 2 is a schematic diagram of an exemplary liquid crystal display apparatus.
Figure 3:
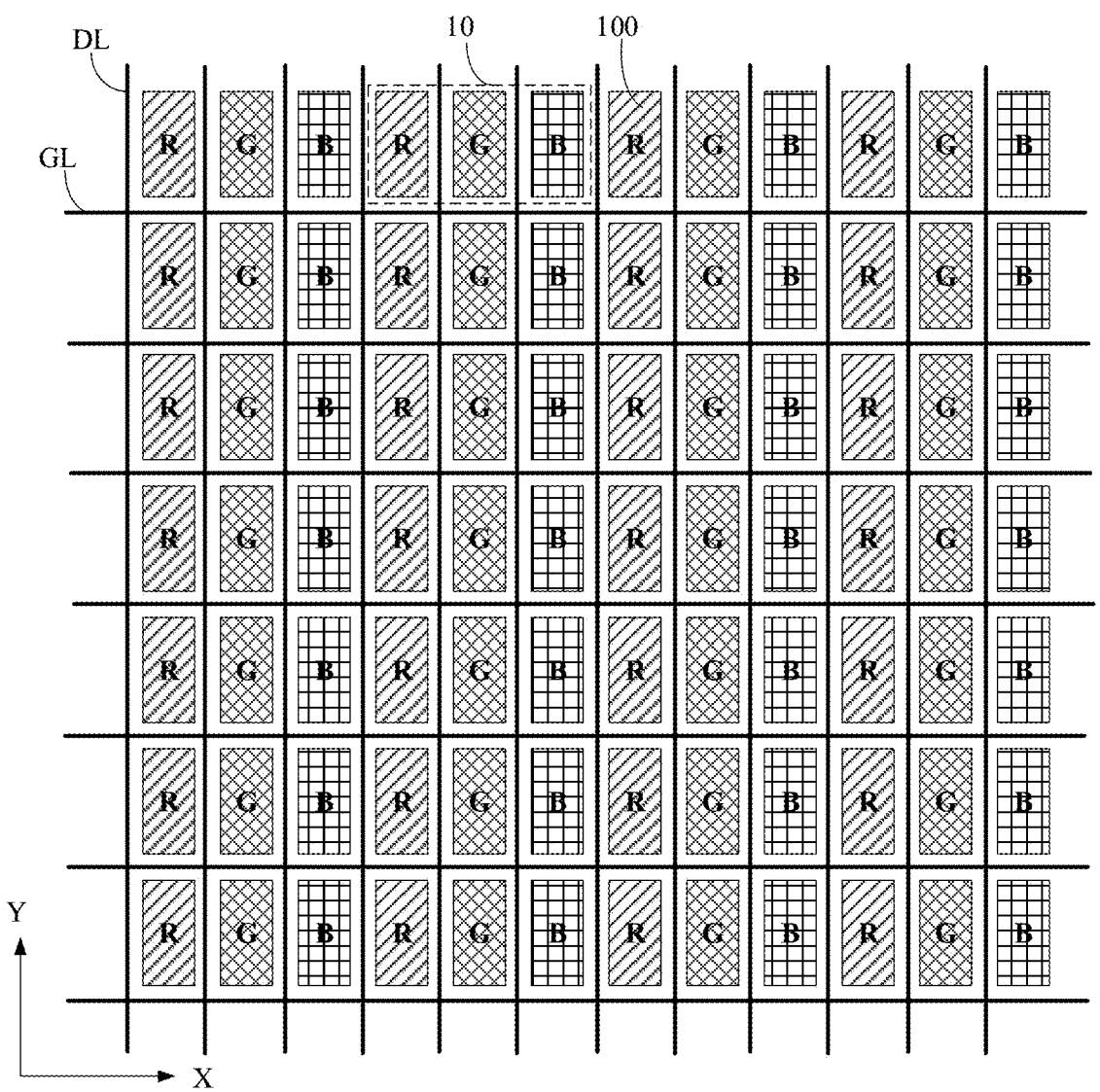
FIG. 3 is a schematic diagram of a pixel arrangement in an exemplary liquid crystal display apparatus.
Figure 4:
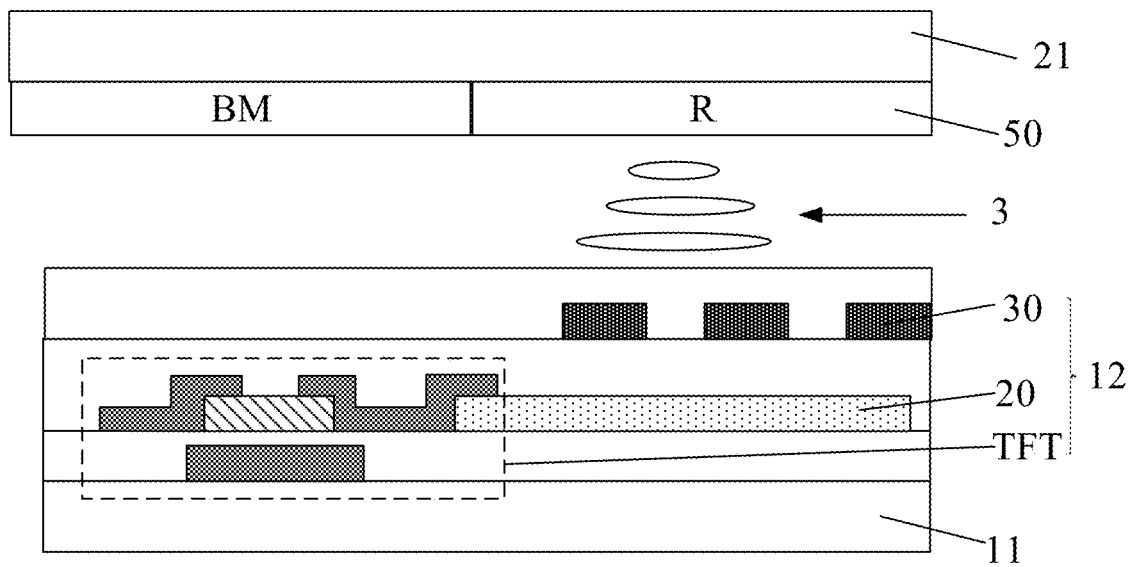
FIG. 4 is a cross-sectional view of a part of the liquid crystal display apparatus shown in FIG. 1.

FIG. 1 is a schematic diagram of an exemplary liquid crystal display apparatus. FIG. 2 is a schematic diagram of an exemplary liquid crystal display apparatus. FIG. 3 is a schematic diagram of a pixel arrangement in an exemplary liquid crystal display apparatus. FIG. 4 is a cross-sectional view of a part of the liquid crystal display apparatus shown in FIG. 1. As shown in FIGS. 1 to 4, the liquid crystal display apparatus includes a display module, a backlight module 6 disposed on a light incoming side of the display module, a first polarizer 4 disposed on a light incoming side of the display module, and a second polarizer 5 disposed between the display module and the backlight module 6. The display module is divided into a plurality of pixel units, and each pixel unit 10 includes a plurality of sub-pixels 100. In the embodiment of the present disclosure, as an example, the sub-pixels 100 in each pixel unit 10 are respectively a red sub-pixel R, a green sub-pixel G, and a blue sub-pixel B. The pixel units 10 arranged side by side in a first direction X have a same arrangement of the sub-pixels 100. For example: the sub-pixels 100 of each pixel unit 10 in a first column are arranged in the arrangement of the red, green, and blue sub-pixels R, G, and B (from left to right), and the sub-pixels 100 of each pixel unit 10 in a second column are arranged in the arrangement of the red, green, and blue sub-pixels R, G, and B (from left to right). With continued reference to FIG. 3, in the pixel structure, the sub-pixels 100 arranged side by side in a second direction Y have the same color. For example: the sub-pixels 100 arranged side by side in the second direction Y are all red sub-pixels R.

It should be noted that a color of each sub-pixel 100 depends on a color of a color filter in the sub-pixel 100. If the color filter in the sub-pixel 100 is red, the sub-pixel 100 is called a red sub-pixel R. Similarly, if the color filter in the sub-pixel 100 is green, the sub-pixel 100 is called a green sub-pixel G; and if the color filter in the sub-pixel 100 is blue, the sub-pixel 100 is called a blue sub-pixel B.

The display module includes a first substrate and a second substrate which are oppositely arranged, a liquid crystal layer 3 arranged between the first substrate and the second substrate. One of the first substrate and the second substrate is an array substrate 1, and the other is a color filter substrate 2. In the embodiment of the present disclosure, as an example, the first substrate is the array substrate 1, and the second substrate is the color filter substrate 2 for description. The array substrate 1 includes a first base substrate 11, and a driving layer 12 disposed on the first base substrate 11. The driving layer 12 includes a plurality of gate lines GL and a plurality of data lines DL and thin film transistors TFT, pixel electrodes 20, and common electrodes 30 of the sub-pixels disposed on the first base substrate 11. In some examples, gate electrodes of the thin film transistors TFT in the sub-pixels located in the same row are connected to the same gate line GL, source electrodes of the thin film transistors TFT in the sub-pixels located in the same column are connected to the same data line DL, and the drain electrode of the thin film transistor TFT is connected to the pixel electrode 20 in the sub-pixel in which the thin film transistor TFT is located. The color filter substrate 2 includes a second base substrate 21 and a color filter layer 50 arranged on the second base substrate 21: the color filter layer 50 includes color filters and black matrixes BM, each of which is disposed between two adjacent color filters, and the color filters are disposed in one-to-one correspondence with the sub-pixels. For example: the color filter in the red sub-pixel is red, the color filter in the green sub-pixel is green, and the color filter in the blue sub-pixel is blue.

Figure 5:
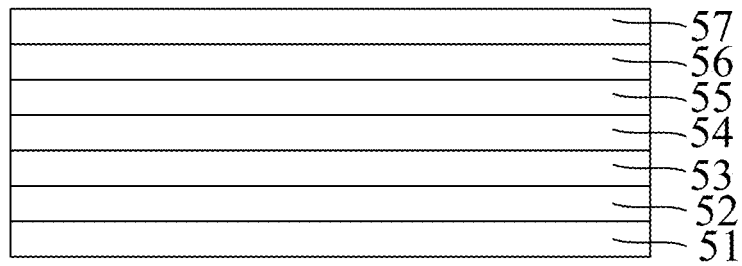
FIG. 5 is a schematic diagram of an exemplary first polarizer.

Layer structures for the first polarizer 4 and the second polarizer 5 may be substantially the same. FIG. 5 is a schematic diagram of an exemplary first polarizer 4. As shown in FIG. 5, the first polarizer 4 includes a release film 51, an adhesive layer 52, a first support layer 53, a polarizing layer 54, a second support layer 55, a low reflection layer 56, and a protective layer 57, which are stacked. In this case, the release film 51 of the first polarizer 4 is removed, and the adhesive layer 52 may be adhered to the first base substrate 11. Similarly, when the second polarizer 5 has the same structure as the first polarizer 4, the release film 51 of the second polarizer 5 may be removed, and the adhesive layer 52 may be adhered to the second base substrate 21.

Currently, the non-contact gesture interaction technology plays an increasingly important role in the field of human-computer interaction. At present, the non-contact interaction can be realized by a plurality of methods, including machine vision, ultrasound, millimeter waves or the like. The millimeter wave-based interaction is a technical and market hotspot because it is not influenced by ambient light, protects the privacy, and has a wide interaction range. An embodiment of the present disclosure provides a display apparatus integrated with a millimeter wave antenna.

Figure 6:
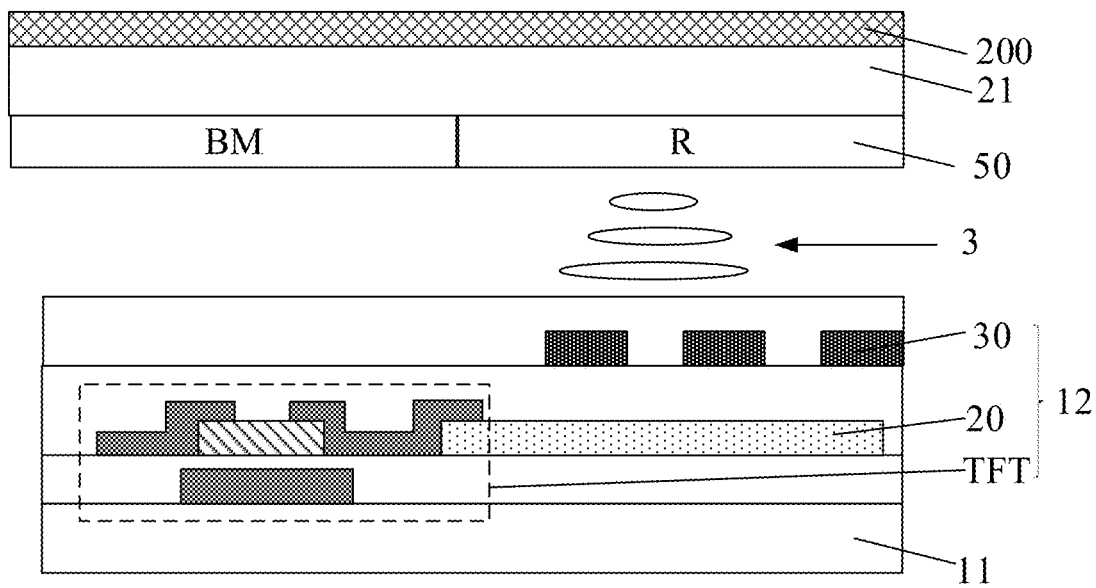
FIG. 6 is a cross-sectional view of a part of a first display apparatus according to an embodiment of the present disclosure.

In a first aspect, FIG. 6 is a partial cross-sectional view of a first display apparatus according to an embodiment of the present disclosure. As shown in FIG. 6, an embodiment of the present disclosure provides a display apparatus, which includes a display module and a plurality of antenna units integrated on the display module. The display module at least includes a first substrate, a second substrate and a liquid crystal layer 3, the first substrate and the second substrate are oppositely arranged, and the liquid crystal layer is positioned between the first substrate and the second substrate. Each antenna unit includes a first radiation portion 201 and a first reference electrode which are oppositely arranged: the first radiation portion 201 is disposed on a light outgoing side of the display module. The first substrate includes a first base substrate 11 and a driving layer 12 arranged on a side of the first base substrate 11 close to the liquid crystal layer 3: the driving layer 12 is also used as the first reference electrode in each antenna unit.

It should be noted that as shown in FIGS. 1 and 2, in the embodiment of the present disclosure, the first substrate is the array substrate 1, and the second substrate is the color filter substrate 2. The second substrate may include a second base substrate 21, and a color filter layer 50 disposed on a side of the second base substrate 21 close to the liquid crystal layer 3. One of the array substrate 1 and the color filter substrate 2 may be closer to the light outgoing side than the other one, which will be described below for each case. In addition, it should be understood that when the first radiation portion 201 in each antenna unit is disposed on the light outgoing side of the display module, the first radiation portion 201 must have excellent light transmittance.

The antenna units are integrated in the display apparatus in the embodiment of the present disclosure, so that the non-contact human-computer interaction can be achieved. The driving layer 12 in the array substrate 1 is also used as the first reference electrode of each antenna unit in the embodiment of the present disclosure, so that a thickness and a cost of a product can be reduced.

The display apparatus in the embodiments of the present disclosure is described below with reference to specific examples.

A first example is as follows: as shown in FIG. 6, the first substrate of the display module of the display apparatus is the array substrate 1, and the second substrate is the color filter substrate 2. The array substrate 1 and the color filter substrate 2 are disposed opposite to each other, and the color filter substrate 2 is closer to the light outgoing side of the display module than the array substrate 1, that is, light emitted from the backlight module 6 is emitted from the array substrate 1 to the color filter substrate 2. The array substrate 1 includes the first base substrate 11 and the driving layer 12 disposed on a side of the first base substrate 11 close to the liquid crystal layer 3. The color filter substrate 2 includes the second base substrate 21 and the color filter layer 50 arranged on a side of the second base substrate 21 close to the liquid crystal layer 3: the color filter layer 50 includes color filters of a plurality of colors and black matrixes BM each disposed between two adjacent color filters. For example: the color filters include a red color filter, a green color filter, a blue color filter, and the like. The first radiation portion 201 in each antenna unit is arranged on a side of the second base substrate 21 away from the color filter layer 50. The driving layer 12 on the array substrate 1 is also used as the first reference electrode in each antenna unit.

Figure 7:
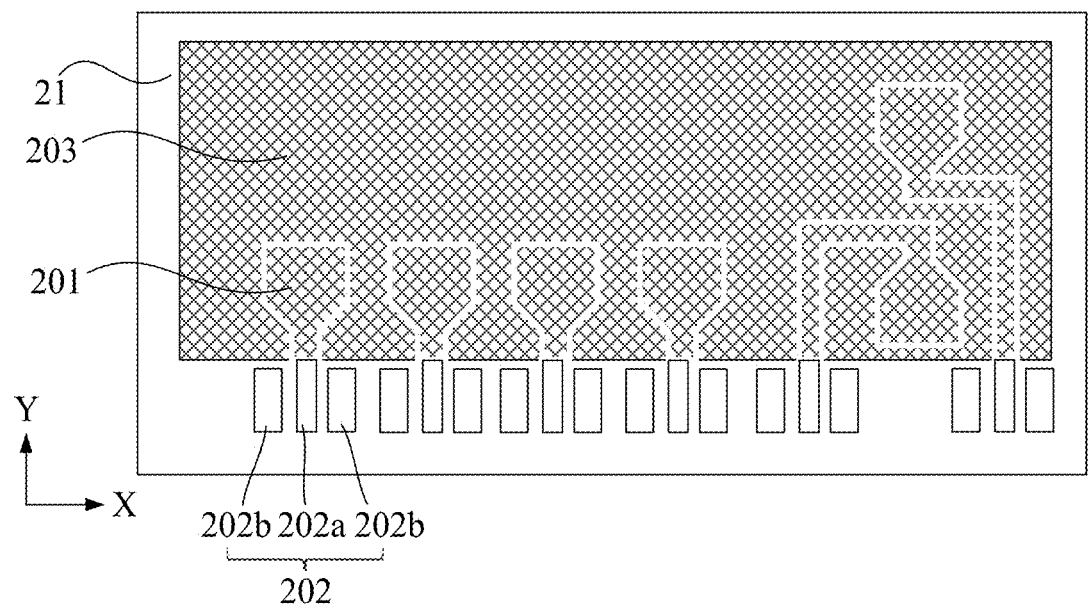
FIG. 7 is a top view of a first radiation layer in a display apparatus according to an embodiment of the present disclosure.
Figure 8:
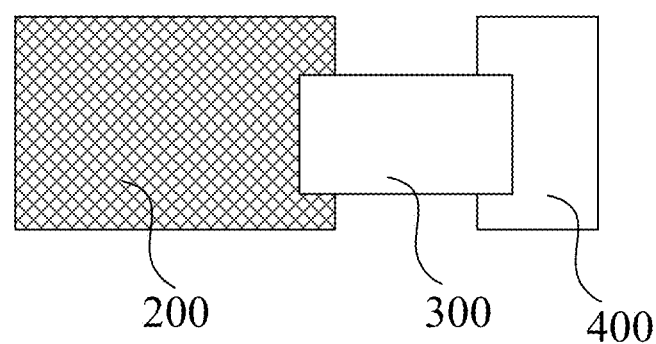
FIG. 8 is a schematic diagram illustrating the feeding of a first radiation layer in a display apparatus according to an embodiment of the present disclosure.

In some examples, FIG. 7 is a top view of a first radiation layer 200 in a display apparatus according to an embodiment of the present disclosure. FIG. 8 is a schematic diagram illustrating the feeding of a first radiation layer 200 in a display apparatus according to an embodiment of the present disclosure. As shown in FIGS. 7 and 8, the antenna unit includes not only the first radiation portion 201 and the first reference electrode, but also a feed structure 202 provided on the second base substrate 21, and a first feed line electrically connecting the first radiation portion 201 and the feed structure 202. The feed structure 202 may include a transmission line. For example: the feed structure 202 may be a coplanar waveguide (CPW) transmission line. Specifically, the feed structure 202 includes a signal electrode 202a and second reference electrodes 202b disposed on both sides of an extending direction of the signal electrode 202a. The signal electrode 202a is electrically connected to the first radiation portion 201 through the first feed line. It should be noted that in the embodiment of the present disclosure, as an example, the feed structure 202 is the CPW transmission line for description, but it should be understood that the feed structure 202 is not limited thereto, and thus the CPW transmission line does not constitute a limitation to the type of the feed structure 202 in the embodiment of the present disclosure.

Further, as shown in FIG. 8, in addition to the above structure, the display apparatus in the example further includes a flexible adapter plate 300 and a printed circuit board 400. The flexible adapter plate 300 is configured to realize the transmission of radio frequency signals between the feed structure 202 and the printed circuit board 400. For example: a bonding connection is formed between the feed structure 202 and the flexible adapter plate 300, and a bonding connection is also formed between the printed circuit board 400 and the flexible adapter plate 300. When the feed structure 202 is bonded to the flexible circuit board and the printed circuit board 400 is bonded to the flexible adapter plate 300, a diameter of each conductive gold ball in an adopted transparent optical conductive adhesive (ACF adhesive) is larger than 10 μm, so that lower signal loss can be obtained.

In some examples, as shown in FIG. 7, each antenna unit includes a first sub-unit and a second sub-unit: one of the first sub-unit and the second sub-unit is a transmitting antenna, and the other is a receiving antenna. In the embodiment of the present disclosure, as an example, the first sub-unit is a receiving antenna, and the second sub-unit is a transmitting antenna for description. Specifically, as shown in FIG. 7, the first radiation portions 201 in the receiving antennas are arranged along the first direction X, and the first radiation portions 201 in the transmitting antennas are arranged side by side along the second direction Y. That is, the first radiation portions 201 of the transmitting antennas and the first radiation portions 201 of the receiving antennas are disposed in different directions, so that accurate gesture recognition can be achieved.

In some examples, with continued reference to FIG. 6, the display apparatus in the example may further include a first radiation layer 200 disposed on a side of the second base substrate 21 away from the color filter layer 50. The first radiation portions 201 are located in the first radiation layer 200, and the first radiation layer 200 further includes redundant radiation portions each located between two adjacent first radiation portions 201, and the redundant radiation portions are disconnected from the first radiation portions 201. Alternatively, the first radiation layer 200 may further include a first feed line connected to the first radiation portion 201, and the like. In the embodiment of the present disclosure, the reason for providing the redundant radiating portions each between two adjacent first radiating portions 201 is to ensure uniform light transmittance of the display apparatus.

Figure 9:
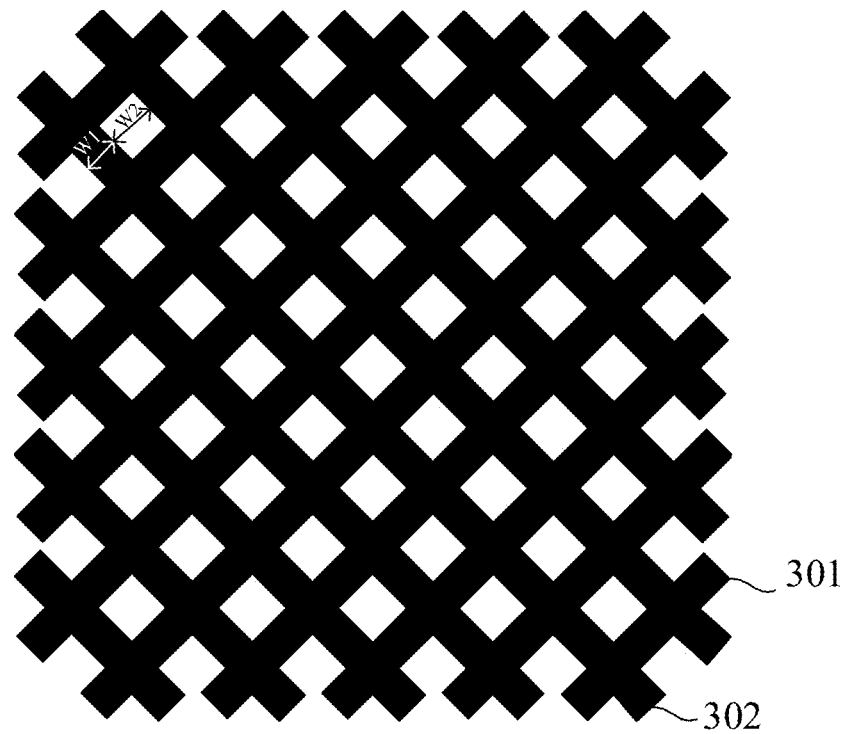
FIG. 9 is a schematic diagram of a part of a conductive mesh structure in a display apparatus according to an embodiment of the present disclosure.

In some examples, FIG. 9 is a schematic diagram of a part of a conductive mesh structure in a display apparatus according to an embodiment of the present disclosure. As shown in FIG. 9, the first radiation layer 200 includes a conductive mesh structure. The conductive mesh structure includes first conductive lines 301 and second conductive lines 302 crossing the first conductive lines 301: the first conductive lines 301 and the second conductive lines 302 are broken at boundaries of the first radiation portions 201 and the redundant radiation portions. For example: an extending direction of each first conductive line 301 may be perpendicular to an extending direction of each second conductive line 302 of the conductive mesh structure, thereby forming a square or a rectangular hollow portion. Alternatively, the extending direction of each first conductive line 301 may not be perpendicular to an extending direction of each second conductive line 302 of the conductive mesh structure. For example: an angle between the extending directions of the first conductive line 301 and the second conductive line 302 is 63°, thereby forming a diamond-shaped hollow portion.

In some examples, line widths, line thicknesses, and line spacing of the first conductive lines 301 and the second conductive lines 302 of the conductive mesh structure are preferably all the same, respectively. Alternatively, line widths, line thicknesses, and line spacing of the first conductive lines 301 and the second conductive lines 302 of the conductive mesh structure may be different. For example: with continued reference to FIG. 9, each of the first conductive lines 301 and the second conductive lines 302 has a line width W1 in a range of about 1 μm to 30 μm, a line spacing W2 in a range of about 50 μm to 250 μm: a line thickness in a range of about 0.5 μm to 10 μm.

In some examples, a material of the conductive mesh structure includes a metal, such as: copper, silver, aluminum or other metal materials.

In addition, in the embodiment of the present disclosure, the display apparatus includes not only the array substrate 1 and the color filter substrate 2, but also the first polarizer 4 located on a side of the first base substrate 11 away from the driving layer 12, the second polarizer 5 located on a side of the first radiation layer 200 away from the second base substrate 21, and the backlight module 6 located on a side of the first polarizer 4 away from the display module, which are not listed herein.

For the display apparatus in the above example, the embodiment of the present disclosure also provides a method for manufacturing the display apparatus in the example. The method includes: forming an array substrate 1 and a color filer substrate 2, aligning and assembling the array substrate 1 and the color filter substrate 2, and filling liquid crystals between the array substrate 1 and the color filter substrate 2 to form a liquid crystal cell. After forming the liquid crystal cell, the method may further include: thinning the first base substrate 11 and the second base substrate 21 and forming the first radiation layer 200 on the second base substrate 21, thereby integrating the plurality of antenna units in the display apparatus. The steps of forming the array substrate 1 and the color filter substrate 2, and aligning and assembling the array substrate 1 and the color filter substrate 2, and filling liquid crystals between the array substrate 1 and the color filter substrate 2 may be realized by the existing processes. Only the step of forming the first radiation layer 200 on the thinned second base substrate 21 will be specifically described below.

A first method of forming the first radiation layer 200 on the second base substrate 21 includes the steps of:

S11, depositing a conductive layer on the second base substrate 21.

Step S11 may specifically include: performing a magnetron sputtering on the second base substrate 21 by adopting a normal-temperature Sputter process to form the conductive layer. Because a thickness of the layer deposited through each Sputter deposition process is about 2 μm, the conductive layer is formed by adopting the Sputter deposition process, which meets the skin depth requirement of the millimeter wave frequency band. Metal target materials adopted by the Sputter process are high-conductivity materials such as a silver target material and a copper target material.

S12, performing a mesh patterning process on the conductive layer by using a laser forming process to form a conductive mesh structure, i.e. a first radiation layer 200.

In step S12, specifically, a laser direct structuring (LDS) process may be adopted to form the conductive mesh structure, and the laser precision may ensure the design of an effective area and a redundant area of the first radiation layer 200, that is, the first radiation portion 201 and the redundant radiation portion are formed.

A second method of forming the first radiation layer 200 on the second base substrate 21 includes: forming a conductive mesh structure on the second base substrate 21 through a 3D printing process to form the first radiation layer 200. The precision of the 3D printing process meets the requirements of the line width and the line thickness of each of the first conductive lines 301 and the second conductive lines 302 of the conductive mesh structure. The conductive mesh structure is made of metal material, such as copper, silver, aluminum or other high-conductivity materials.

Figure 10:
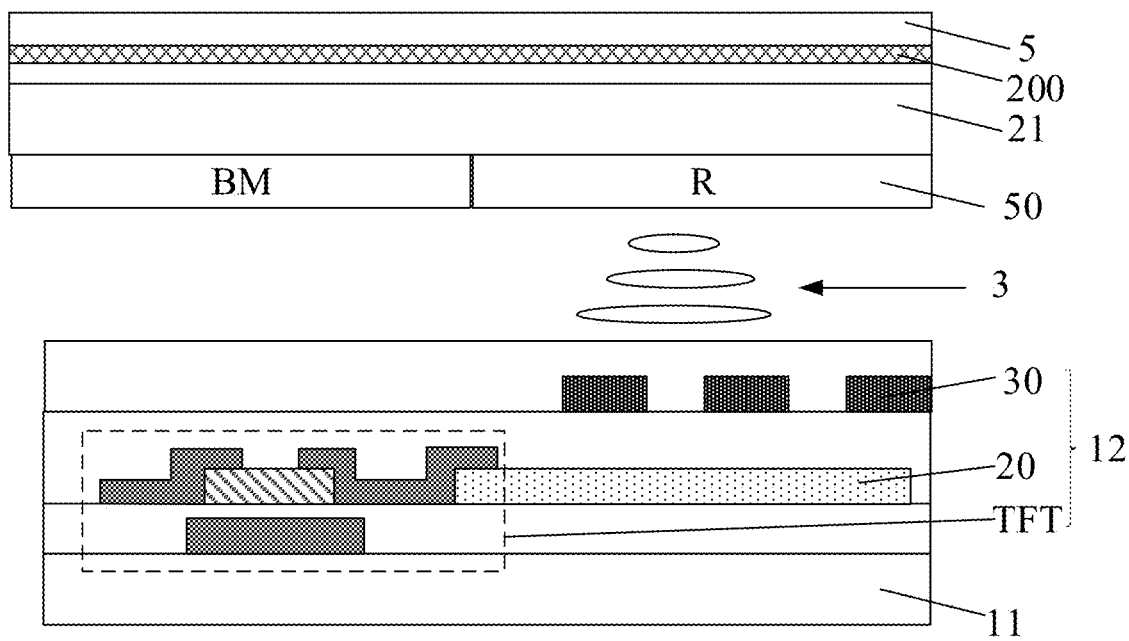
FIG. 10 is a cross-sectional view of a part of a second display apparatus according to an embodiment of the present disclosure.
Figure 11:
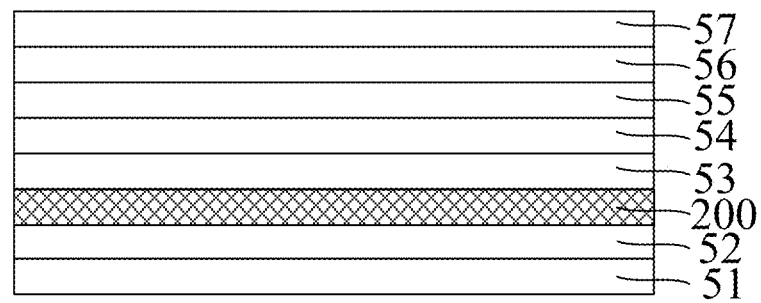
FIG. 11 is a schematic diagram of a second polarizer in the display apparatus of FIG. 10.

A second example is as follows: FIG. 10 is a partial cross-sectional view of a second display apparatus according to an embodiment of the present disclosure. As shown in FIG. 10, the display apparatus in this example has substantially the same structure as the display apparatus in the first example, except that the first radiation portions 201 of the antenna module in the display apparatus are integrated in the second polarizer 5. Specifically, in the embodiment of the present disclosure, each of the first polarizer 4 and the second polarizer 5 has the same structure as the first polarizer 4 shown in FIG. 5, that is, each of the first polarizer 4 and the second polarizer 5 include a release film 51, an adhesive layer 52, a first support layer 53, a polarizing layer 54, a second support layer 55, a low reflection layer 56, and a protective layer 57, which are stacked. In this case, the release film 51 of the first polarizer 4 is removed, and the adhesive layer 52 may be adhered to the first base substrate 11. Similarly, when the second polarizer 5 has the same structure as the first polarizer 4, the release film 51 of the second polarizer 5 may be removed, and the adhesive layer 52 may be adhered to the second base substrate 21. FIG. 11 is a schematic diagram of the second polarizer 5 in the display apparatus of FIG. 10. As shown in FIG. 11, in this example, the first radiation portions 201 are disposed between the first support layer 53 and the adhesive layer 52 of the second polarizer 5. Other structures in the display apparatus may be the same as those in the first example, and therefore, the description thereof will not be repeated.

In this example, a method of manufacturing a display apparatus is also provided, and is the same as that in the first example, except for the step of forming the first radiation layer 200. Only the step of forming the first radiation layer 200 in the second polarizer 5 will be specifically described below.

The step of forming the first radiation layer in the second polarizer 5 includes:
- S21, providing a glass substrate, and forming the first support layer 53 by using a process including, but not limited to, spin coating.
- S22, forming a conductive layer on the first support layer 53 with a magnetron sputtering process.
- S23, performing a patterning process on the conductive layer to form a pattern including a conductive mesh structure, that is, to form the first radiation layer 200.
- S24, peeling off the first support layer 53 from the glass substrate.
- S25, sequentially forming the second support layer 55, the low reflection layer 56, the protective layer 57, the adhesive layer 52 or the like of the second polarizer 5 by using a roll-to-roll process.

Only two examples of the integration of the antenna units in the display apparatus are given above, but it should be understood that the two examples do not limit the protection scope of the embodiments of the present disclosure.

Figure 12:
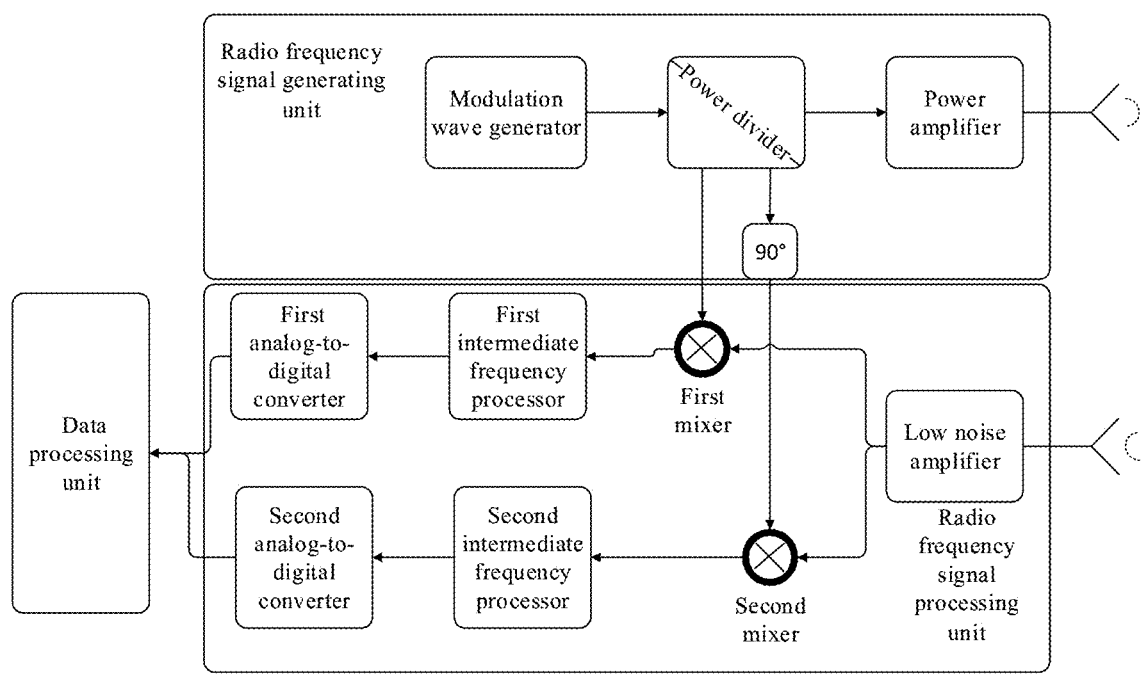
FIG. 12 is a schematic diagram of a part of a structure of a display apparatus according to an embodiment of the present disclosure.

In some examples, FIG. 12 is a schematic diagram of a part of a structure of a display apparatus according to an embodiment of the present disclosure. As shown in FIG. 12, the display apparatus in the embodiment of the present disclosure not only adopts any of the above structures, but also includes a radio frequency signal generating unit, a radio frequency signal processing unit, and a data processing unit when the antenna units include a transmitting antenna and a receiving antenna. The radio frequency signal generating unit is configured to generate a transmitting signal, transmit a part of the transmitting signal through the transmitting antenna, and transmit the other part of the radio frequency signal to the transmitting signal processing unit: the radio frequency signal processing unit is configured to process the transmitting signal transmitted by the radio frequency signal generating unit and a return signal received by the receiving antenna: the data processing unit is configured to acquire gesture information according to the processed transmitting signal and the return signal.

Referring to FIG. 12, the radio frequency signal generating unit in the embodiment of the present disclosure includes a modulation wave generator, a power divider, and a power amplifier. The radio frequency signal processing unit includes: a low noise amplifier, a first mixer, a second mixer, a first intermediate frequency processor, a second intermediate frequency processor, a first analog-to-digital converter and a second analog-to-digital converter. The modulation wave generator is configured to generate a frequency modulated continuous wave as the transmitting signal. For example: the modulation wave generator generates a triangular wave, a sawtooth wave, code modulation, noise frequency modulation, or the like. The power divider may be a one-to-two power divider configured to divide the transmitting signal generated by the modulation wave generator into two parts, one part is transmitted to the power amplifier; the other part is transmitted to the first mixer, is phase-shifted by 90° and then is transmitted to the second mixer. The power amplifier is configured to amplify the transmitting signal transmitted by the power divider and then transmit the amplified transmitting signal through the transmitting antenna. The low noise amplifier is configured to amplify a return signal received by the antenna. The first mixer is configured to mix the transmitting signal transmitted by the power divider with the amplified return signal and output a first mixing signal. The second mixer is configured to mix the transmitting signal transmitted by the power divider and phase-shifted by 90° with the amplified return signal and output a second mixing signal. The first intermediate frequency processor is configured to process the first mixing signal to obtain a first intermediate frequency signal. The second intermediate frequency processor is configured to process the second mixing signal to obtain a second intermediate frequency signal. The first analog-to-digital converter is configured to convert the first intermediate frequency signal into a first digital signal and transmit the first digital signal to the data processing unit. The second analog-to-digital converter is configured to convert the second intermediate frequency signal into a second digital signal and transmit the second digital signal to the data processing unit. In the embodiment of the present disclosure, a quadrature sampling architecture is adopted, that is, the first mixer and the second mixer are adopted to generate IQ quadrature signals, and quantization sampling is performed on the IQ quadrature signals, respectively, so that the problem of superposition of intermediate frequency mirror noise can be avoided.

In some examples, the data processing unit includes a first processing core and a second processing core, the first processing core performs an analysis operation on data output by the first analog-to-digital converter and the second analog-to-digital converter to generate information of a reflecting object. The analysis operation includes at least one of One-Dimensional Fast Fourier transform (1D FFT), Two-Dimensional Fast Fourier transform (2D FFT) and Angle Of Arrival (AOA) calculation; distance information and speed information may be correspondingly obtained through the 1D FFT and the 2D FFT, and AOA information may be correspondingly obtained through the AOA calculation. The second processing core recognizes a gesture action through a pre-trained gesture recognition network based on the information of the reflecting object, and determines a control instruction expected by the user.

In some examples, the first processing core is further configured to determine a valid return signal based on a Peak Search algorithm and a Constant False-Alarm Rate (CFAR) algorithm before performing the AOA calculation.

The second processing core is configured to perform a chirp control on a radar signal, generate a human body action recognition network through pre-training, recognize human body actions through the human body action recognition network according to the information of the reflecting object, and determine a corresponding control instruction. The chirp refers to the characteristic of a signal with time-varying instantaneous frequency. In some embodiments, the radar signal is a frequency modulated continuous wave signal, and accordingly, the second processing core is configured to configure a chirp parameter of the frequency modulated continuous wave signal. In some embodiments, the human body action recognition network may be independently configured as a gesture recognition network for accurate recognition of gesture actions. In some embodiments, the human body action recognition network is a convolutional neural network, and may be based on a Torch architecture, a Pytorch architecture, a VGG architecture, or the like, and the convolutional neural network has fewer parameters, a fast determination speed, and a high determination accuracy, and is particularly suitable for recognizing an image. It should be noted that the above recognition network may adopt the convolutional neural network or other neural network models, which are suitable for the technical solution of the present disclosure, and thus, the description thereof is omitted.

In some examples, the first processing core may employ a DSP processing core and the second processing core may employ an ARM processing core.

In a second aspect, an embodiment of the present disclosure further provides an electronic device, which includes the display apparatus in any one of the above embodiments. In some examples, the electronic device may be a refrigerator, a washing machine, a range hood, or the like that includes a display function.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A display apparatus, comprising a display module and a plurality of antenna units integrated on the display module; wherein the display module comprises a first substrate and a second substrate opposite to each other and a liquid crystal layer between the first substrate and the second substrate; each antenna unit comprises a first radiation portion and a first reference electrode opposite to each other; the first radiation portion is on a light outgoing side of the display module; and the first substrate comprises a first base substrate and a driving layer on a side of the first base substrate close to the liquid crystal layer; and the driving layer is also used as the first reference electrode of the antenna unit;

wherein the second substrate comprises a second base substrate and a color filter layer on a side of the second base substrate close to the liquid crystal layer; and the first radiation portion is on a side of the second base substrate away from the color filter layer.

2. The display apparatus according to claim 1, further comprising a first polarizer on a light incoming side and a second polarizer on the light outgoing side; and the second polarizer comprises an adhesive layer, a first support layer, a polarizing layer, a second support layer, a low reflection layer and a protective layer which are stacked in a direction away from the liquid crystal layer; and the first radiation portion is between the first support layer and the adhesive layer.

3. The display apparatus according to claim 2, wherein the plurality of antenna units comprises a plurality of first sub-units and a plurality of second sub-units; the plurality of first sub-units are arranged side by side along a first direction; and the plurality of second sub-units are arranged side by side along a second direction; the display apparatus further comprises a radio frequency signal generating unit, a radio frequency signal processing unit and a data processing unit;

the radio frequency signal generating unit is configured to generate a transmitting signal, transmit one part of the transmitting signal through the plurality of second sub-units, and transmit the other part of the transmitting signal to the radio frequency signal processing unit;

the radio frequency signal processing unit is configured to process the transmitting signal transmitted by the radio frequency signal generating unit and a return signal received by the plurality of first sub-units; and the data processing unit is configured to acquire gesture information according to the processed transmitting signal and the processed return signal.

4. The display apparatus according to claim 1, wherein the antenna unit further comprises a feed structure electrically connected to the first radiation portion.

5. The display apparatus according to claim 4, wherein the feed structure comprises a signal electrode, and second reference electrodes on both sides of an extending direction of the signal electrode; and the signal electrode is connected to the first radiation portion through a first feed line.

6. The display apparatus according to claim 5, further comprising a flexible adapter plate and a printed circuit board;

wherein the feed structure is bonded to the flexible adapter plate; and the flexible adapter plate is bonded to the printed circuit board.

7. The display apparatus according to claim 6, wherein the plurality of antenna units comprises a plurality of first sub-units and a plurality of second sub-units; the plurality of first sub-units are arranged side by side along a first direction; and the plurality of second sub-units are arranged side by side along a second direction; the display apparatus further comprises a radio frequency signal generating unit, a radio frequency signal processing unit and a data processing unit;

the radio frequency signal generating unit is configured to generate a transmitting signal, transmit one part of the transmitting signal through the plurality of second sub-units, and transmit the other part of the transmitting signal to the radio frequency signal processing unit;

the radio frequency signal processing unit is configured to process the transmitting signal transmitted by the radio frequency signal generating unit and a return signal received by the plurality of first sub-units; and the data processing unit is configured to acquire gesture information according to the processed transmitting signal and the processed return signal.

8. The display apparatus according to claim 5, wherein the plurality of antenna units comprises a plurality of first sub-units and a plurality of second sub-units; the plurality of first sub-units are arranged side by side along a first direction; and the plurality of second sub-units are arranged side by side along a second direction; the display apparatus further comprises a radio frequency signal generating unit, a radio frequency signal processing unit and a data processing unit;
the radio frequency signal generating unit is configured to generate a transmitting signal, transmit one part of the transmitting signal through the plurality of second sub-units, and transmit the other part of the transmitting signal to the radio frequency signal processing unit;
the radio frequency signal processing unit is configured to process the transmitting signal transmitted by the radio frequency signal generating unit and a return signal received by the plurality of first sub-units; and
the data processing unit is configured to acquire gesture information according to the processed transmitting signal and the processed return signal.

9. The display apparatus according to claim 4, wherein the plurality of antenna units comprises a plurality of first sub-units and a plurality of second sub-units; the plurality of first sub-units are arranged side by side along a first direction; and the plurality of second sub-units are arranged side by side along a second direction; the display apparatus further comprises a radio frequency signal generating unit, a radio frequency signal processing unit and a data processing unit;
the radio frequency signal generating unit is configured to generate a transmitting signal, transmit one part of the transmitting signal through the plurality of second sub-units, and transmit the other part of the transmitting signal to the radio frequency signal processing unit;
the radio frequency signal processing unit is configured to process the transmitting signal transmitted by the radio frequency signal generating unit and a return signal received by the plurality of first sub-units; and
the data processing unit is configured to acquire gesture information according to the processed transmitting signal and the processed return signal.

10. The display apparatus according to claim 1, wherein the plurality of antenna units comprises a plurality of first sub-units and a plurality of second sub-units; the first radiation portions of the plurality of first sub-units are arranged side by side along a first direction; and the first radiation portions of the plurality of second sub-units are arranged side by side along a second direction.

11. The display apparatus according to claim 1, further comprising a first radiation layer on the light outgoing side of the display module; the first radiation portions are in the first radiation layer; and
the first radiation layer further comprises redundant radiation portions, each of which is between two adjacent first radiation portions, and the redundant radiation portions are disconnected from the first radiation portions.

12. The display apparatus according to claim 11, wherein the first radiation layer comprises a conductive mesh structure; the conductive mesh structure comprises a plurality of first conductive lines and a plurality of second conductive lines crossing the plurality of first conductive lines; and the plurality of first conductive lines and the plurality of second conductive lines are broken at boundaries of the first radiation portions and the redundant radiation portions.

13. The display apparatus according to claim 12, wherein each of the plurality of first conductive lines and the plurality of second conductive lines has a line width in a range of 2 μm to 30 μm; and a line thickness in a range of 1 μm to 10 μm.

14. The display apparatus according to claim 1, wherein the plurality of antenna units comprises a plurality of first sub-units and a plurality of second sub-units; the plurality of first sub-units are arranged side by side along a first direction; and the plurality of second sub-units are arranged side by side along a second direction; the display apparatus further comprises a radio frequency signal generating unit, a radio frequency signal processing unit and a data processing unit;
the radio frequency signal generating unit is configured to generate a transmitting signal, transmit one part of the transmitting signal through the plurality of second sub-units, and transmit the other part of the transmitting signal to the radio frequency signal processing unit;
the radio frequency signal processing unit is configured to process the transmitting signal transmitted by the radio frequency signal generating unit and a return signal received by the plurality of first sub-units; and
the data processing unit is configured to acquire gesture information according to the processed transmitting signal and the processed return signal.

15. The display apparatus according to claim 14, wherein the radio frequency signal generating unit comprises a modulation wave generator, a power divider, and a power amplifier;
the modulation wave generator configured to generate a frequency modulated continuous wave as the transmitting signal;
the power divider is configured to divide the transmitting signal generated by the modulation wave generator into two parts; and
the power amplifier is configured to amplify the transmitting signal transmitted by the power divider and transmit the amplified transmitting signal through a transmitting antenna.

16. The display apparatus according to claim 15, wherein the radio frequency signal processing unit comprises: a low noise amplifier, a first mixer, a second mixer, a first intermediate frequency processor, a second intermediate frequency processor, a first analog-to-digital converter and a second analog-to-digital converter;
the low noise amplifier is configured to amplify the return signal received by the plurality of first sub-units;
the first mixer is configured to mix the transmitting signal transmitted by the power divider with the amplified return signal, and then output a first mixing signal;
the second mixer is configured to mix the transmitting signal transmitted by the power divider and phase-shifted by 90° with the amplified return signal, and then output a second mixing signal;
the first intermediate frequency processor is configured to process the first mixing signal to obtain a first intermediate frequency signal;
the second intermediate frequency processor is configured to process the second mixing signal to obtain a second intermediate frequency signal;
the first analog-to-digital converter is configured to convert the first intermediate frequency signal into a first digital signal and transmit the first digital signal to the data processing unit; and the second analog-to-digital converter is configured to convert the second intermediate frequency signal into a second digital signal and transmit the second digital signal to the data processing unit.

17. An electronic device, comprising the display apparatus according to claim 1.

\* \* \* \* \*